United States Patent
Long et al.

(10) Patent No.: US 7,510,496 B2
(45) Date of Patent: Mar. 31, 2009

(54) ELECTRO-HYDRAULIC CONTROL SYSTEM WITH INTERLOCK PROTECTION

(75) Inventors: Charles F. Long, Pittsboro, IN (US); Clifford H. Oehme, Avon, IN (US)

(73) Assignee: General Motors Corporation, Detroit, MI (US)

( * ) Notice: Subject to any disclaimer, the term of this patent is extended or adjusted under 35 U.S.C. 154(b) by 203 days.

(21) Appl. No.: 11/422,384

(22) Filed: Jun. 6, 2006

(65) Prior Publication Data
US 2007/0281816 A1    Dec. 6, 2007

(51) Int. Cl.
*F16H 31/00* (2006.01)

(52) U.S. Cl. .................. 475/123; 475/116; 475/120; 475/121; 475/129

(58) Field of Classification Search .......... 475/116, 475/120, 121, 123, 127, 129; 137/625.64; 91/433
See application file for complete search history.

(56) References Cited

U.S. PATENT DOCUMENTS

| | | | | |
|---|---|---|---|---|
| 5,911,244 A | | 6/1999 | Long et al. | 137/625.64 |
| 6,077,182 A | * | 6/2000 | Long et al. | 475/128 |
| 6,520,881 B1 | * | 2/2003 | Long et al. | 475/119 |
| 6,585,617 B1 | * | 7/2003 | Moorman et al. | 475/119 |
| 7,140,993 B2 | * | 11/2006 | Long et al. | 475/119 |

* cited by examiner

*Primary Examiner*—David D. Le

(57) ABSTRACT

An electro-hydraulic control system for a transmission is provided having first, second, and third selectively engageable torque transmitting mechanisms. The control system includes a main source of fluid pressure and first, second, and third trim valves operable to effect the engagement of respective first, second, and third torque transmitting mechanisms. A latch valve is in fluid communication with the first torque transmitting mechanism and an interlock valve is in selective fluid communication with the latch valve. The first trim valve, latch valve, and interlock valve are in fluid communication with the main source of fluid pressure. The first trim valve operates selectively communicate fluid pressure to the latch valve to effect engagement of the first torque transmitting mechanism, while the interlock valve is operable to selectively communicate fluid pressure to one of the second and third trim valve to effect engagement of the respective second and third torque transmitting mechanisms.

24 Claims, 3 Drawing Sheets

ELECTRO-HYDRAULIC CONTROL SYSTEM WITH INTERLOCK PROTECTION

TECHNICAL FIELD

The present invention relates to electro-hydraulic control systems for an automatically shiftable transmission.

BACKGROUND OF THE INVENTION

Multi-speed vehicular transmissions, particularly those using planetary gear arrangements, require a hydraulic system to provide controlled engagement and disengagement, on a desired schedule, of the clutches and brakes or torque transmitting mechanisms that operate to establish the ratios within the planetary gear arrangement.

These control systems have evolved from substantially pure hydraulic control systems, wherein hydraulic devices produce all of the control signals to electro-hydraulic control systems, wherein an electronic control unit produces a number of the control signals. An electronic control unit emits electrical control signals to solenoid valves, which then issue controlled hydraulic signals to the various operative valves within the transmission control.

With many of the early pure hydraulic and first generation electro-hydraulic control systems, the power transmission utilized a number of freewheel or one-way devices which smooth the shifting or ratio interchange of the transmission during both upshifting and downshifting of the transmission. This relieves the hydraulic control system from providing for the control of overlap between the torque transmitting mechanism that was coming on and the torque transmitting mechanism that was going off. If this overlap is excessive, the driver feels a shudder in the drivetrain, and if the overlap is too little, the driver experiences engine flare or a sense of coasting. The freewheel device prevents this feeling by quickly engaging when the torque imposed thereon is reversed from a freewheeling state to a transmitting state.

The advent of electro-hydraulic devices gave rise to what is known as clutch-to-clutch shift arrangements to reduce the complexity of the transmission and its control system. These electro-hydraulic control systems are generally perceived to reduce cost and reduce the space required for the control system.

In addition, with the advent of more sophisticated control systems, the transmissions have advanced from two-speed or three-speed transmissions to five-speed and six-speed transmissions. In at least one presently available six-speed transmission, just five friction devices are employed to provide six forward speeds, neutral condition, and a reverse speed. The torque capacity of a torque transmitting mechanism (on-coming or off-going) involved in a shift may be controlled by the combination of an electrically activated solenoid valve and a pressure regulator valve or trim valve. In a typical system, the solenoid valve is activated by pulse-width-modulation (PWM) at a controlled duty cycle to develop a pilot or control pressure for the pressure regulator valve or trim valve, which in turn, supplies fluid pressure to the torque transmitting mechanisms in proportion to the solenoid duty cycle.

SUMMARY OF THE INVENTION

An electro-hydraulic control system is provided for an automatically shiftable transmission having first, second, and third selectively engageable torque transmitting mechanisms. The electro-hydraulic control system includes a main source of fluid pressure. A first, second, and third trim valve operate to effect the engagement of respective first, second, and third torque transmitting mechanisms. A latch valve is provided in fluid communication with the first torque transmitting mechanism, while an interlock valve in selective fluid communication with the latch valve. The first trim valve is in fluid communication with the main source of fluid pressure. The latch valve and the interlock valve are in fluid communication with the main source of fluid pressure. The first trim valve operates to selectively and variably communicate fluid pressure to the latch valve to effect engagement of the first torque transmitting mechanism. The interlock valve is operable to selectively communicate fluid pressure to one of the second and third trim valves to effect engagement of the respective second and third torque transmitting mechanisms. The latch valve preferably includes a differential area operable maintain the latch valve in position when the first toque transmitting mechanism is engaged.

The automatically shiftable transmission may further include a fourth torque transmitting mechanism and the electro-hydraulic control system may include a fourth trim valve operable to effect the engagement of the fourth torque transmitting mechanism. The interlock valve operates to selectively communicate fluid pressure to the fourth trim valve to effect engagement of the fourth torque transmitting mechanism. In addition, the automatically shiftable transmission may also include a fifth torque transmitting mechanism and the electro-hydraulic control system may include a fifth trim valve in fluid communication with the main source of fluid pressure. The fifth trim valve is operable to effect the engagement of the fifth torque transmitting mechanism.

The interlock valve is preferably sufficiently configured to disallow fluid pressure to the second trim valve when fluid pressure is provided to the third trim valve. Alternately, the interlock valve is preferably sufficiently configured to disallow fluid pressure to the third trim valve when fluid pressure is provided to the second trim valve. The interlock valve may also be sufficiently configured to disallow fluid pressure to the second trim valve when fluid pressure is provided to the fourth and/or fifth trim valve. Alternately, the interlock valve may be sufficiently configured to disallow fluid pressure to the fourth and/or fifth trim valve when fluid pressure is provided to the second trim valve.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
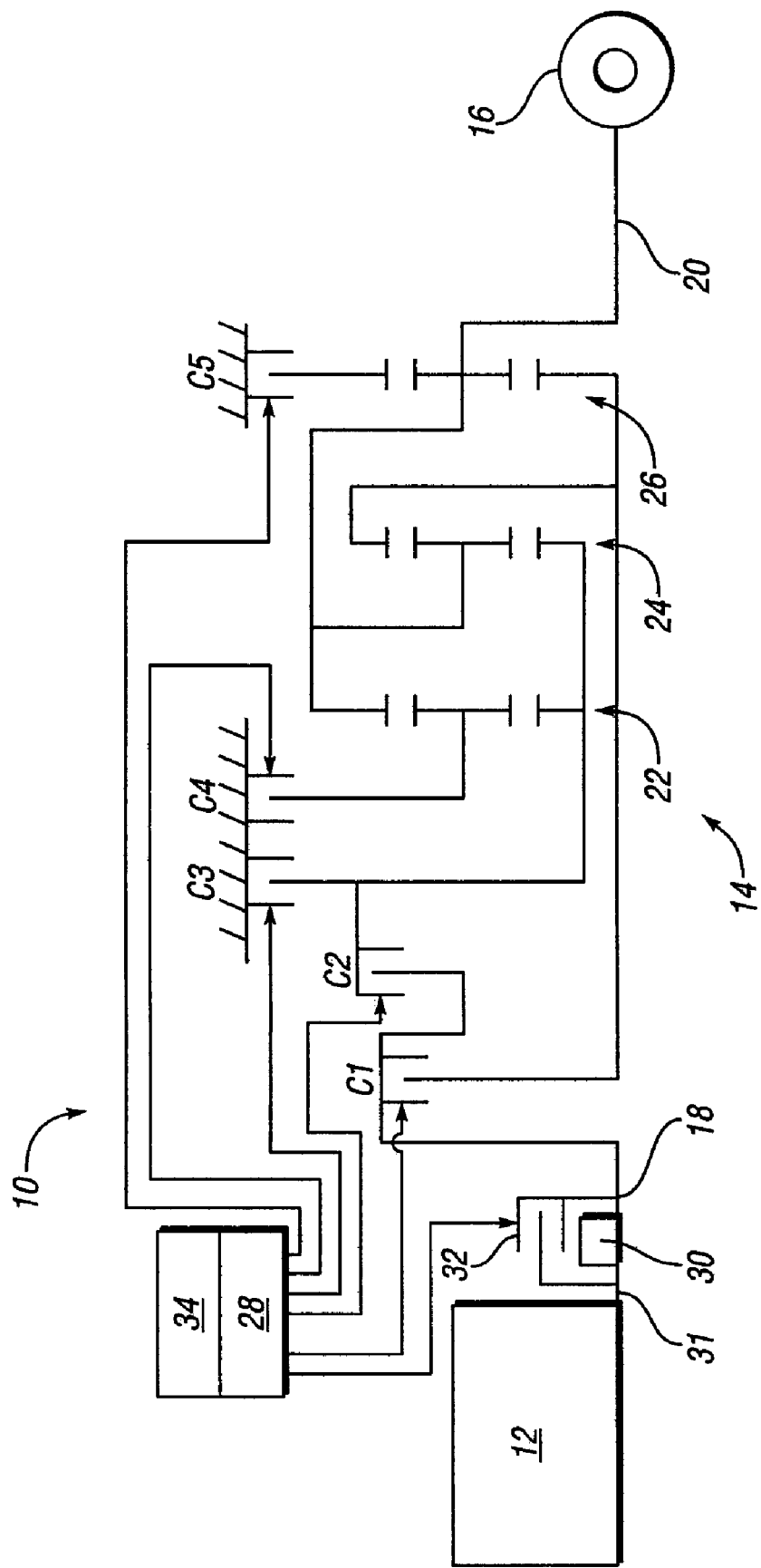
FIG. 1 is a schematic representation of a powertrain incorporating an automatically shiftable transmission controlled by the electro-hydraulic control system of the present invention.

Referring to the drawings, wherein like characters represent the same or corresponding components throughout the several figures, there is shown in FIG. 1 a powertrain 10 having an a power source 12, an automatically shiftable transmission 14, and a final drive 16.

Figure 2A:
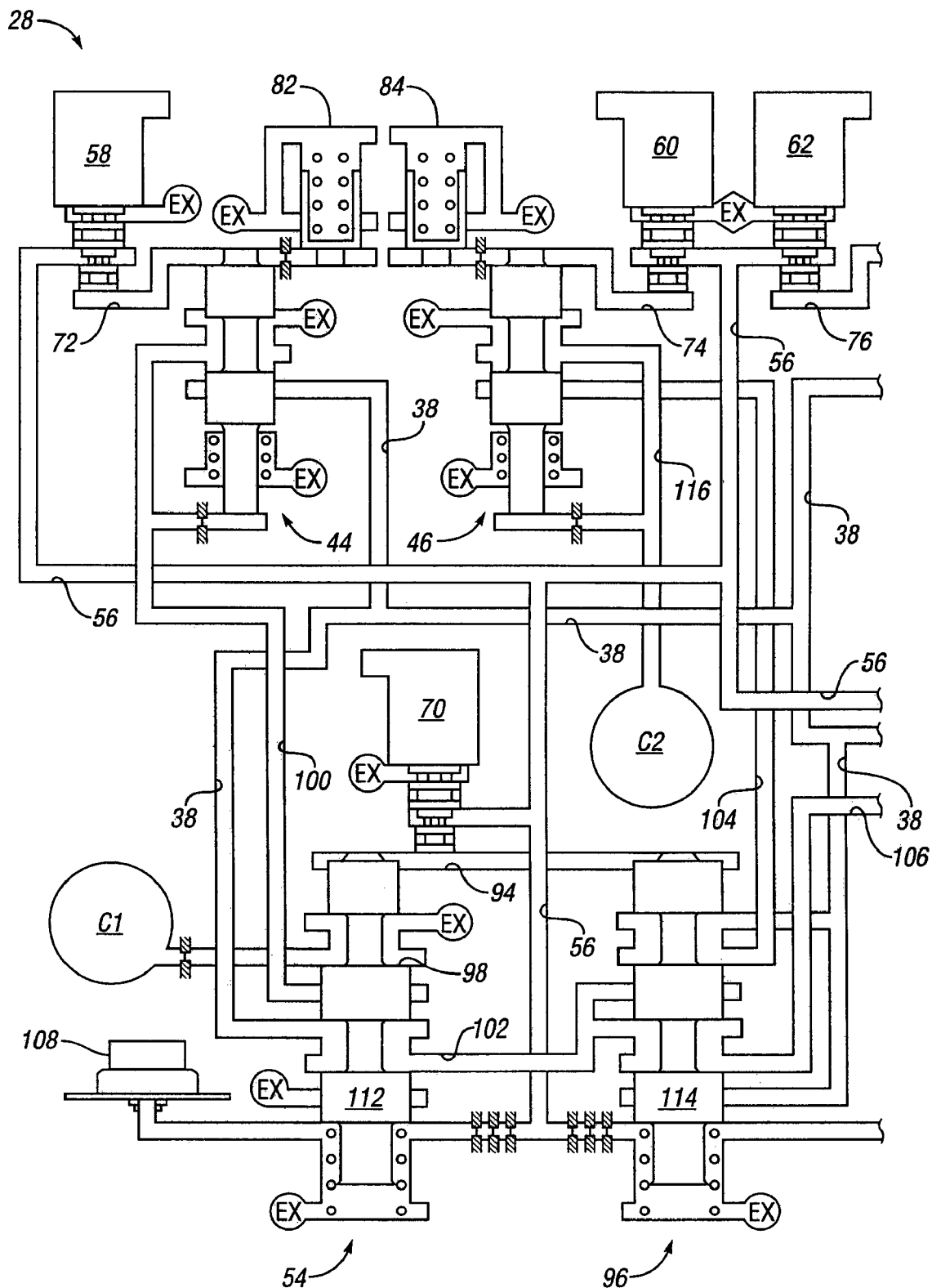
FIGS. 2a and 2b, taken together and placed side by side, represent a schematic representation of the electro-hydraulic control system utilized by the powertrain of FIG. 1 and depicting the electro-hydraulic control system in an electrical power on, neutral mode of operation.
Figure 2B:
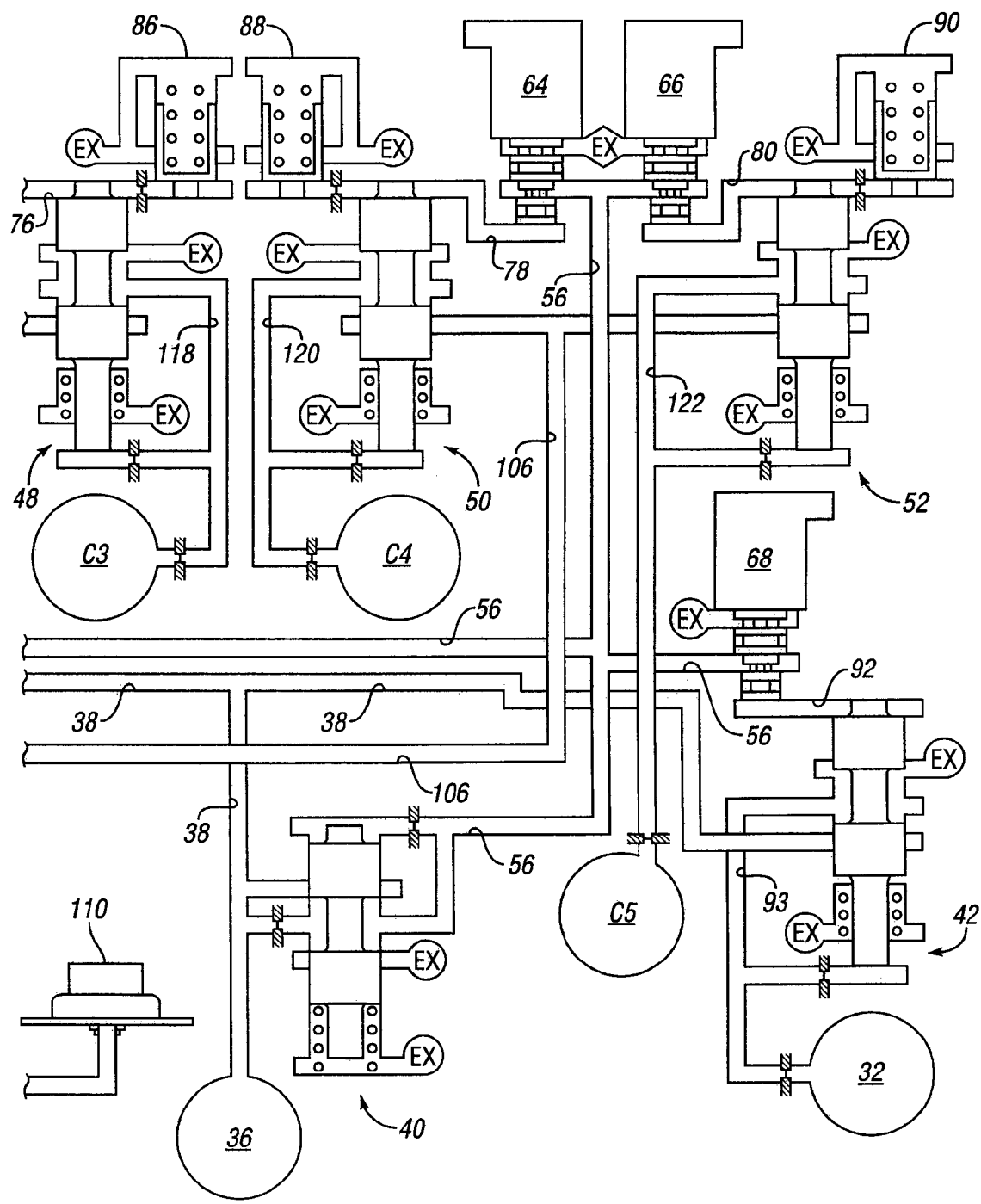

The power source 12 is preferably an engine, such as an internal combustion engine. The automatically shiftable transmission 14 includes a planetary gear arrangement having an input shaft 18, an output shaft 20, three planetary gearsets 22, 24, and 26, five torque transmitting mechanisms C1, C2, C3, C4, and C5 and an electro-hydraulic control system 28. The torque transmitting mechanisms C1 and C2 are fluid-operated rotating clutch-type devices, while the torque transmitting mechanisms C3, C4, and C5 are fluid-operated stationary clutch or brake devices. The selective engagement and disengagement of the torque transmitting mechanisms C1, C2, C3, C4, and C5 is controlled by the electro-hydraulic control system 28, the details of which is shown in FIGS. 2a and 2b. A fluid coupler or torque converter 30 is provided between an output shaft 31 of the power source 12 and the input shaft 18 of the automatically shiftable transmission 14. A lockup clutch 32 is provided to substantially lock the output shaft 31 and the input shaft 18 for unitary rotation, thereby bypassing the torque converter 30 to increase the operating efficiency of the powertrain 10 under certain operating conditions.

An electronic control unit, or ECU 34, provides control signals to the electro-hydraulic control system 28. The ECU 34 receives a number of electrical signals from the vehicle, power source 12, and automatically shiftable transmission 14, such as engine speed, throttle angle, vehicle speed, to name a few. These electrical signals are used as input signals for a programmable digital computer, which is incorporated within the ECU 34. The ECU 34 is then effective to distribute the control signals as required to enable the operation of the automatically shiftable transmission 14 in a controlled manner.

The planetary gear arrangement, as shown in FIG. 1, provides four forward speed ratios or ranges between the input shaft 18 and the output shaft 20. In the first forward range, the torque transmitting mechanisms C1 and C5 are engaged. In the second forward range, the torque transmitting mechanisms C1 and C4 are engaged. In the third forward range, the torque transmitting mechanisms C1 and C3 are engaged. In the fourth forward range, the torque transmitting mechanisms C1 and C2 are engaged. The gearing also provides a neutral condition when the torque transmitting mechanisms C1, C2, C3, C4, and C5 are disengaged. Additionally, a first reverse range is provided wherein the torque transmitting mechanisms C2 and C5 are engaged. A second reverse range is provided wherein the torque transmitting mechanisms C2 and C4 are engaged.

The powertrain 10 has two speed ranges of drive-home capabilities within the electrically variable hybrid transmission 14 in the event that the electro-hydraulic control system 28 undergoes a malfunction or discontinuance of electrical power. In the electrical power off drive home modes, the electro-hydraulic control system 28 defaults to a neutral mode of operation wherein the torque transmitting mechanism C3 is engaged, and a forward mode of operation wherein the torque transmitting mechanisms C1 and C3 are engaged, such as the third forward range.

As shown in FIGS. 2a and 2b, the electro-hydraulic control system 28 includes a main source of fluid pressure 36 such as from a hydraulic pump, not shown. The main source of fluid pressure 36 operates to pressurize a main passage 38. The main passage 38 is in fluid communication with control regulator valve 40, a lockup clutch trim valve 42, a trim valve 44, a trim valve 46, a trim valve 48, a trim valve 50, a trim valve 52, and a C1 latch valve 54. Additionally, a plurality exhaust passage, each labeled as "EX" in FIGS. 2a and 2b, operate to depressurize or exhaust fluid pressure.

The control regulator valve 40 operates to reduce the fluid pressure within the main passage 38 to a control pressure within a control passage 56. The fluid within the control passage 56 is communicated to a plurality of solenoid valves 58, 60, 62, 64, 66, 68, and 70. The solenoid valve 70 is an on/off type solenoid valve, while the solenoid valves 58, 60, 62, 64, 66, and 68 are variable pressure type solenoid valves. The solenoid valve 58 and 62 are normally high or normally open type solenoid valve, while the remaining solenoid valves 60, 64, 66, and 68 are normally low or normally closed type solenoid valves. As is known to those skilled in the art, a normally open solenoid valve will distribute output pressure in the absence of a command signal to the solenoid valve.

The solenoid valve 58 is operable to provide an output pressure in a passage 72 that controls the bias pressure on the trim valve 44. The solenoid valve 60 is operable to provide an output pressure in passage 74 that controls the pressure bias on the trim valve 46. The solenoid valve 62 is operable to provide an output pressure in a passage 76 that controls the pressure bias on the trim valve 48. The solenoid valve 64 is operable to provide an output pressure in a passage 78 that controls the pressure bias on the trim valve 50. Additionally, the solenoid valve 66 is operable to provide an output pressure in a passage 80 that controls the pressure bias on the trim valve 52. The trim valves 44, 46, 48, 50 and 52 are selectively biased into a second position or a pressure set position by fluid pressure within their respective passages 72, 74, 76, 78 and 80. When the passages 72, 74, 76, 78 and 80 are exhausted or depressurized, via the respective solenoid valves 58, 60, 62, 64, and 66, their respective trim valves 44, 46, 48, 50 and 52 will move to a first position or a spring set position. Additionally, the trim valves 44, 46, 48, 50 and 52 each have a trim or pressure regulation position for smooth torque transmitting mechanism engagement. Accumulator valves 82, 84, 86, 88, and 90 are provided in fluid communication with a respective passage 72, 74, 76, 78 and 80. The accumulator valves 82, 84, 86, 88, and 90 operate to control torque transmitting mechanism engagement by damping fluid pressure fluctuations within the passages 72, 74, 76, 78 and 80.

The solenoid valve 68 is operable to provide an output pressure in passage 92 that controls the bias pressure or control pressure on the lockup clutch trim valve 42. The lockup clutch trim valve 42 has a pressure set position, a spring set position, as shown in FIG. 2b, and a trim or regulation position. The lockup clutch trim valve 42 operates to selectively engage the lockup clutch 32 to increase the operating efficiency of the powertrain 10, shown in FIG. 1, under certain operating conditions. To engage the lockup clutch 32, the lockup clutch trim valve 42 selectively and variably communicates fluid pressure from the main passage 38 to the lockup clutch 32 through the outlet passage 93. Additionally, the outlet passage 93 provides feedback to control the trim valve 42 when in the trim or regulation position.

The solenoid valve 70 is operable to provide an output pressure in passage 94 that controls the pressure bias on the C1 latch valve 54 and an interlock valve 96. The C1 latch valve 54 and the interlock valve 96 each have a pressure set position and a spring set position, as shown in FIG. 2a. The C1 latch valve 54 has a differential area 98 operable to latch the C1 latch valve 54 in the pressure set position. When fluid pressure is present within an outlet passage 100, the differential area 98 is provided with the force necessary to bias the C1 latch valve 54 in the pressure set position. The trim valve 44 selectively communicates fluid to the C1 latch valve through the outlet passage 100. A passage 102 fluidly interconnects the C1 latch valve 54 with the interlock valve 96. The interlock valve 96 selectively communicates fluid pressure to the trim valve 46 through passage 104. Additionally, the interlock valve 96 selectively communicates fluid pressure to trim valves 50 and 52 through passage 106.

A first pressure switch 108 is provided in selective fluid communication with the C1 latch valve 54 and operates to signal the position of the C1 latch valve 54 for diagnostic purposes. Similarly, a second pressure switch 110 is provided in selective fluid communication with the interlock valve 96 and operates to signal the position of the interlock valve 96 for diagnostic purposes. In operation with C1 latch valve 54 and the interlock valve 96 in the spring set position, as shown in FIG. 2a, the first and second pressure switches 108 and 110 will exhaust. When the C1 latch valve 54 is in the pressure set position, a land 112 will disallow or block any further exhausting of the first pressure switch 108 and allow fluid pressure within the control passage 56 to communicate with the first pressure switch 108 thereby indicating that the C1 latch valve 54 is in the pressure set position. When the interlock valve 96 is in the pressure set position, a land 114 will disallow any further exhausting of the second pressure switch 110 and allow fluid pressure within the control passage 56 to communicate with the second pressure switch 110 thereby indicating that the interlock valve 96 is in the pressure set position.

The C1 latch valve 54 cooperates with the trim valve 44 to control the engagement of the torque transmitting mechanism C1 through the outlet passage 100. The trim valve 46 operates to control the engagement of the torque transmitting mechanism C2 through the outlet passage 116. The trim valve 48 operates to control the engagement of the torque transmitting mechanism C3 through the outlet passage 118. The trim valve 50 operates to control the engagement of the torque transmitting mechanism C4 through the outlet passage 120. Similarly, the trim valve 52 operates to control the engagement of the torque transmitting mechanism C5 through the outlet passage 122. Each of the outlet passages 100, 116, 118, 120, and 122 provide feedback to control the respective trim valve 44, 46, 48, 50, and 52 when in the trim or regulation position.

Neutral Mode of Operation

When the neutral mode of operation, as shown in FIGS. 2a and 2b, is requested by the ECU 34 the C1 latch valve 54 and the interlock valve 96 are placed in the spring set position. Additionally, each of the trim valves 44, 46, 48, 50, and 52 are placed in the spring set position. In the neutral mode of operation, the torque transmitting mechanisms C1, C2, C3, C4, and C5 are disengaged. The torque transmitting mechanism C1 will exhaust through the C1 latch valve 54. The torque transmitting mechanism C2 will exhaust through the trim valve 46. The torque transmitting mechanism C3 will exhaust through the trim valve 48. The torque transmitting mechanism C4 will exhaust through the trim valve 50. Additionally, the torque transmitting mechanism C5 will exhaust through the trim valve 52.

First Reverse Range Mode of Operation

When the first reverse range mode of operation is requested by the ECU 34, the C1 latch valve 54 and the interlock valve 96 are placed in the spring set position. Additionally, each of the trim valves 44, 48 and 50 are placed in the spring set position, while the trim valves 46 and 52 are biased into the trim position by the respective solenoid valve 60 and 66. In the first reverse range mode of operation, the torque transmitting mechanisms C1, C3, and C4 are disengaged, while the torque transmitting mechanisms C2 and C5 are engaged. The torque transmitting mechanism C1 will exhaust through the C1 latch valve 54. The torque transmitting mechanism C3 will exhaust through the trim valve 48. Additionally, the torque transmitting mechanism C4 will exhaust through the trim valve 50.

The engagement of the torque transmitting mechanism C2 is controlled via the trim valve 46. With the interlock valve 96 in the spring set position, fluid pressure within the main pressure passage 38 is communicated to the passage 104 for subsequent communication to the trim valve 46. With the trim valve 46 in the trim position, fluid pressure within the passage 104 is selectively and variably communicated to the outlet passage 116 to effect engagement of the torque transmitting mechanism C2. The engagement of the torque transmitting mechanism C5 is controlled via the trim valve 52. With the C1 latch valve 54 and the interlock valve 96 in the spring set position, fluid pressure within the main pressure passage 38 is communicated from the C1 latch valve 54 to the interlock valve 96 via passage 102. Fluid pressure is subsequently communicated from the interlock valve 96 to the passage 106 for subsequent communication to the trim valve 52. With the trim valve 52 in the trim position, fluid pressure within the passage 106 is selectively and variably communicated to the outlet passage 122 to effect engagement of the torque transmitting mechanism C5.

Second Reverse Range Mode of Operation

When the second reverse range mode of operation is requested by the ECU 34, the C1 latch valve 54 and the interlock valve 96 are placed in the spring set position. Additionally, each of the trim valves 44, 48 and 52 are placed in the spring set position, while the trim valves 46 and 50 are biased into the trim position by the respective solenoid valve 60 and 64. In the second reverse range mode of operation, the torque transmitting mechanisms C1, C3, and C5 are disengaged, while the torque transmitting mechanisms C2 and C4 are engaged. The torque transmitting mechanism C1 will exhaust through the C1 latch valve 54. The torque transmitting mechanism C3 will exhaust through the trim valve 48. Additionally, the torque transmitting mechanism C5 will exhaust through the trim valve 52.

The engagement of the torque transmitting mechanism C2 is controlled via the trim valve 46. With the interlock valve 96 in the spring set position, fluid pressure within the main pressure passage 38 is communicated to the passage 104 for subsequent communication to the trim valve 46. With the trim valve 46 in the trim position, fluid pressure within the passage 104 is selectively and variably communicated to the outlet passage 116 to effect engagement of the torque transmitting mechanism C2. The engagement of the torque transmitting mechanism C4 is controlled via the trim valve 50. With the C1 latch valve 54 and the interlock valve 96 in the spring set position, fluid pressure within the main pressure passage 38 is communicated from the C1 latch valve 54 to the interlock valve 96 via passage 102. Fluid pressure is subsequently communicated from the interlock valve 96 to the passage 106 for subsequent communication to the trim valve 50. With the trim valve 50 in the trim position, fluid pressure within the passage 106 is selectively and variably communicated to the outlet passage 120 to effect engagement of the torque transmitting mechanism C4.

First Forward Range of Operation

When the first forward range mode of operation is requested by the ECU 34, the C1 latch valve 54 and the interlock valve 96 are biased into the pressure set position by the solenoid valve 70. Additionally, each of the trim valves 46, 48, and 50 are placed in the spring set position, while the trim valves 44 and 52 are biased into the trim position by the respective solenoid valve 58 and 66. In the first forward range mode of operation, the torque transmitting mechanisms C2, C3, and C4 are disengaged, while the torque transmitting mechanisms C1 and C5 are engaged. The torque transmitting mechanism C2 will exhaust through the trim valve 46. The torque transmitting mechanism C3 will exhaust through the trim valve 48. Additionally, the torque transmitting mechanism C4 will exhaust through the trim valve 50.

The engagement of the torque transmitting mechanism C1 is controlled via the trim valve 44. The trim valve 44 operates to selectively and variably communicate fluid pressure from within the main pressure passage 38 to the outlet passage 100 for subsequent communication to the C1 latch valve 54. With the C1 latch valve 54 in the pressure set position, the fluid pressure within the outlet passage 100 is communicated to the torque transmitting mechanism C1 to effect engagement. Additionally it should be understood that the fluid pressure acting on the differential area 98 when the toque transmitting mechanism C1 is engaged will maintain the C1 latch valve 54 in the pressure set position. The engagement of the torque transmitting mechanism C5 is controlled via the trim valve 52. With the interlock valve 96 in the pressure set position, fluid pressure within the main pressure passage 38 is communicated to the passage 106, via the interlock valve 96, for subsequent communication to the trim valve 52. With the trim valve 52 in the trim position, fluid pressure within the passage 106 is selectively and variably communicated to the outlet passage 122 to effect engagement of the torque transmitting mechanism C5.

Second Forward Range Mode of Operation

When the second forward range mode of operation is requested by the ECU 34, the C1 latch valve 54 and the interlock valve 96 are biased into the pressure set position by the solenoid valve 70. Additionally, each of the trim valves 46, 48, and 52 are placed in the spring set position, while the trim valves 44 and 50 are biased into the trim position by the respective solenoid valve 58 and 64. In the second forward range mode of operation, the torque transmitting mechanisms C2, C3, and C5 are disengaged, while the torque transmitting mechanisms C1 and C4 are engaged. The torque transmitting mechanism C2 will exhaust through the trim valve 46. The torque transmitting mechanism C3 will exhaust through the trim valve 48. Additionally, the torque transmitting mechanism C5 will exhaust through the trim valve 52.

The engagement of the torque transmitting mechanism C1 is controlled via the trim valve 44. The trim valve 44 operates to selectively and variably communicate fluid pressure from within the main pressure passage 38 to the outlet passage 100 for subsequent communication to the C1 latch valve 54. With the C1 latch valve 54 in the pressure set position, the fluid pressure within the outlet passage 100 is communicated to the torque transmitting mechanism C1 to effect engagement. Additionally it should be understood that the fluid pressure acting on the differential area 98 when the toque transmitting mechanism C1 is engaged will maintain the C1 latch valve 54 in the pressure set position. The engagement of the torque transmitting mechanism C4 is controlled via the trim valve 50. With the interlock valve 96 in the pressure set position, fluid pressure within the main pressure passage 38 is communicated to the passage 106, via the interlock valve 96, for subsequent communication to the trim valve 50. With the trim valve 50 in the trim position, fluid pressure within the passage 106 is selectively and variably communicated to the outlet passage 120 to effect engagement of the torque transmitting mechanism C4.

Third Forward Range Mode of Operation

When the third forward range mode of operation is requested by the ECU 34, the C1 latch valve 54 and the interlock valve 96 are biased into the pressure set position by the solenoid valve 70. Additionally, each of the trim valves 46, 50, and 52 are placed in the spring set position, while the trim valves 44 and 48 are biased into the trim position by the respective solenoid valve 58 and 62. In the third forward range mode of operation, the torque transmitting mechanisms C2, C4, and C5 are disengaged, while the torque transmitting mechanisms C1 and C3 are engaged. The torque transmitting mechanism C2 will exhaust through the trim valve 46. The torque transmitting mechanism C4 will exhaust through the trim valve 50. Additionally, the torque transmitting mechanism C5 will exhaust through the trim valve 52.

The engagement of the torque transmitting mechanism C1 is controlled via the trim valve 44. The trim valve 44 operates to selectively and variably communicate fluid pressure from within the main pressure passage 38 to the outlet passage 100 for subsequent communication to the C1 latch valve 54. With the C1 latch valve 54 in the pressure set position, the fluid pressure within the outlet passage 100 is communicated to the torque transmitting mechanism C1 to effect engagement. Additionally, it should be understood that the fluid pressure acting on the differential area 98 when the torque transmitting mechanism C1 is engaged will maintain the C1 latch valve 54 in the pressure set position. The engagement of the torque transmitting mechanism C3 is controlled via the trim valve 48. With the trim valve 48 in the trim position, fluid pressure within the main pressure passage 38 is selectively and variably communicated to the outlet passage 118 to effect engagement of the torque transmitting mechanism C3.

When an alternate third forward range mode of operation is requested, the C1 latch valve 54 is latched in the pressure set position by the fluid pressure within the toque transmitting mechanism C1 engaging the differential area 98. The interlock valve 96 is placed in the spring set position as a result of the solenoid valve 70 exhausting fluid pressure from the passage 94.

Fourth Forward Range Mode of Operation

When the third forward range mode of operation is requested by the ECU 34, the C1 latch valve 54 is latched in the pressure set position by the fluid pressure within the toque transmitting mechanism C1 engaging the differential area 98. The interlock valve 96 is placed in the spring set position as a result of the solenoid valve 70 exhausting fluid pressure from the passage 94. Additionally, each of the trim valves 48, 50, and 52 are placed in the spring set position, while the trim valves 44 and 46 are biased into the trim position by the respective solenoid valve 58 and 60. In the fourth forward range mode of operation, the torque transmitting mechanisms C3, C4, and C5 are disengaged, while the torque transmitting mechanisms C1 and C2 are engaged. The torque transmitting mechanism C3 will exhaust through the trim valve 48. The torque transmitting mechanism C4 will exhaust through the trim valve 50. Additionally, the torque transmitting mechanism C5 will exhaust through the trim valve 52.

The engagement of the torque transmitting mechanism C1 is controlled via the trim valve 44. The trim valve 44 operates to selectively and variably communicate fluid pressure from within the main pressure passage 38 to the outlet passage 100 for subsequent communication to the C1 latch valve 54. With the C1 latch valve 54 latched in the pressure set position, the fluid pressure within the outlet passage 100 is communicated to the torque transmitting mechanism C1 to effect engagement. The engagement of the torque transmitting mechanism C2 is controlled via the trim valve 46. With the interlock valve 96 in the spring set position, fluid pressure within the main pressure passage 38 is communicated to the passage 104 for subsequent communication to the trim valve 46. With the trim valve 46 in the trim position, fluid pressure within the passage 104 is selectively and variably communicated to the outlet passage 116 to effect engagement of the torque transmitting mechanism C2.

First Power OFF Drive Home Mode of Operation

If there is an interruption of electrical power to the electro-hydraulic control system 28 and the automatically shiftable transmission 14 is operating in the first or second reverse range or the neutral mode of operation, the electro-hydraulic control system 28 will default to the first power OFF drive home mode of operation. In this mode, the C1 latch valve 54 and the interlock valve 96 are in the spring set position since the solenoid valve 70 is a normally closed type valve.

The trim valves 44 and 48 will move to the pressure set position since their respective solenoid valves 58 and 62 are normally open type valves. The trim valves 46, 50, and 52 will move to the spring set position since their respective solenoid valves 60, 64, and 66 are normally closed type valves. In the first power OFF drive home mode of operation, the torque transmitting mechanisms C1, C2, C4, and C5 are disengaged, while the torque transmitting mechanism C3 is engaged. The torque transmitting mechanism C1 will exhaust through the C1 latch valve 54. The torque transmitting mechanism C2 will exhaust through the trim valve 46. The torque transmitting mechanism C4 will exhaust through the trim valve 50. Additionally, the torque transmitting mechanism C5 will exhaust through the trim valve 52.

The engagement of the torque transmitting mechanism C3 is controlled via the trim valve 48. With the trim valve 48 in the pressure set position, fluid pressure within the main pressure passage 38 is communicated to the outlet passage 118 to effect engagement of the torque transmitting mechanism C3.

Second Power OFF Drive Home Mode of Operation

If there is an interruption of electrical power to the electro-hydraulic control system 28 and the automatically shiftable transmission 14 is operating in the first, second, third, or fourth forward range mode of operation, the electro-hydraulic control system 28 will default to the second power OFF drive home mode of operation. In this mode, the C1 latch valve 54 is latched in the pressure set position by the fluid pressure within the toque transmitting mechanism C1 engaging the differential area 98. The interlock valve 96 is placed in the spring set position as a result of the solenoid valve 70 exhausting fluid pressure from the passage 94 since the solenoid valve 70 is a normally closed type valve.

The trim valves 44 and 48 will move to the pressure set position since their respective solenoid valves 58 and 62 are normally open type valves. The trim valves 46, 50, and 52 will move to the spring set position since their respective solenoid valves 60, 64, and 66 are normally closed type valves. In the second power OFF drive home mode of operation, the torque transmitting mechanisms C2, C4, and C5 are disengaged, while the torque transmitting mechanisms C1 and C3 are engaged. The torque transmitting mechanism C2 will exhaust through the trim valve 46. The torque transmitting mechanism C4 will exhaust through the trim valve 50. Additionally, the torque transmitting mechanism C5 will exhaust through the trim valve 52.

The engagement of the torque transmitting mechanism C1 is controlled via the trim valve 44. The trim valve 44 operates to communicate fluid pressure from within the main pressure passage 38 to the outlet passage 100 for subsequent communication to the C1 latch valve 54. With the C1 latch valve 54 latched in the pressure set position, the fluid pressure within the outlet passage 100 is communicated to the torque transmitting mechanism C1 to effect engagement. The engagement of the torque transmitting mechanism C3 is controlled via the trim valve 48. With the trim valve 48 in the pressure set position, fluid pressure within the main pressure passage 38 is communicated to the outlet passage 118 to effect engagement of the torque transmitting mechanism C3. In effect, the automatically shiftable transmission 14 will provide a gear ratio equivalent to the third forward range mode of operation.

The C1 latch valve 54 and the interlock valve 96 cooperate to selectively lock out torque transmitting mechanisms to avoid unintentional engagement in various modes of operation. For instance, when operating in the first, second, or third forward range of operation, the engagement of the torque transmitting mechanism C2 will be disallowed. To lock out the torque transmitting mechanism C2, the passage 104, which communicates with the interlock valve 96, is exhausted though passage 102 via the C1 latch valve. This is possible since the C1 latch valve 54 and the interlock valve 96 are placed in the pressure set position by the solenoid valve 70. With the passage 104 exhausted, the trim valve 46 is unable to effect the engagement of the torque transmitting mechanism C2 should the trim valve 46 stick in the trim or pressure set position or the solenoid valve 60 inadvertently energize.

Additionally, when operating in the third or fourth forward range of operation, the engagement of the torque transmitting mechanism C4 and C5 will be disallowed. To lock out the torque transmitting mechanism C4 and C5, the passage 106, which communicates with the interlock valve 96, is exhausted though passage 102 via the C1 latch valve. This is possible since the C1 latch valve 54 is latched in the pressure set position by the fluid pressure within the torque transmitting mechanism C1 acting on the differential area 98 and the interlock valve 96 are placed in spring set position by the solenoid valve 70.

While the best modes for carrying out the invention have been described in detail, those familiar with the art to which this invention relates will recognize various alternative designs and embodiments for practicing the invention within the scope of the appended claims.

The invention claimed is:

1. An electro-hydraulic control system for an automatically shiftable transmission having first, second, and third selectively engageable torque transmitting mechanisms, wherein the automatically shiftable transmission is operable in a plurality of modes of operation including at least one reverse range, a neutral mode of operation, and a plurality of forward ranges, the electro-hydraulic control system comprising:

a main source of fluid pressure;

first, second, and third trim valves operable to effect the engagement of respective first, second, and third torque transmitting mechanisms;

a latch valve in fluid communication with the first torque transmitting mechanism;

an interlock valve in selective fluid communication with the latch valve;

wherein said first trim valve is in fluid communication with said main source of fluid pressure;

wherein said latch valve and said interlock valve are in fluid communication with said main source of fluid pressure;

wherein said first trim valve is operable to selectively and variably communicate fluid pressure to said latch valve to effect engagement of the first torque transmitting mechanism;

wherein said interlock valve is operable to selectively communicate fluid pressure to one of said second and third trim valve to effect engagement of the respective second and third torque transmitting mechanism; and wherein the electro-hydraulic control system is operable to receive control signals from an electronic control unit and, based upon an interruption of said control signals, the electro-hydraulic control system is operable to default to one of a pair of default modes of operation, including:

a first default mode that is the same for each of the plurality of forward ranges; and a second default mode that is the same for each of the at least one reverse range and the neutral mode of operation.

2. The electro-hydraulic control system of claim 1, wherein said interlock valve is sufficiently configured to disallow fluid pressure to said second trim valve when fluid pressure is provided to said third trim valve and wherein said interlock valve is sufficiently configured to disallow fluid pressure to said third trim valve when fluid pressure is provided to said second trim valve.

3. The electro-hydraulic control system of claim 1, further comprising a solenoid valve operable to command said latch valve and said interlock valve.

4. The electro-hydraulic control system of claim 3, wherein said latch valve includes a differential area operable maintain said latch valve in position when the first toque transmitting mechanism is engaged.

5. The electro-hydraulic control system of claim 1, wherein the automatically shiftable transmission has a fourth torque transmitting mechanism and the electro-hydraulic control system further comprises:

a fourth trim valve operable to effect the engagement of the fourth torque transmitting mechanism; and wherein said interlock valve selectively communicates fluid pressure to said fourth trim valve to effect engagement of the fourth torque transmitting mechanism.

6. The electro-hydraulic control system of claim 5, wherein said interlock valve is sufficiently configured to disallow fluid pressure to said second trim valve when fluid pressure is provided to said fourth trim valve and wherein said interlock valve is sufficiently configured to disallow fluid pressure to said fourth trim valve when fluid pressure is provided to said second trim valve.

7. The electro-hydraulic control system of claim 5, further comprising a first, second, third, and fourth accumulator valve in fluid communication with a respective one of said first, second, third, and fourth trim valves and operable to improve control of the engagement of respective first, second, third, and fourth torque transmitting mechanisms.

8. The electro-hydraulic control system of claim 5 wherein the automatically shiftable transmission has a fifth torque transmitting mechanism and the electro-hydraulic control system further comprises:

a fifth trim valve in fluid communication with said main source of fluid pressure; and wherein said fifth trim valve is operable to effect the engagement of the fifth torque transmitting mechanism.

9. The electro-hydraulic control system of claim 8, wherein the interruption of said control signals is based upon an interruption of electrical power and the automatically shiftable transmission is operating in one of a reverse range and a neutral mode of operation, the electro-hydraulic control system is operable to default to the second default mode of operation, wherein the electro-hydraulic control system is operable to disengage the first, second, fourth and fifth torque transmitting devices and to engage the third torque transmitting device.

10. The electro-hydraulic control system of claim 8, wherein the interruption of said control signals is based upon an interruption of electrical power and the automatically shiftable transmission is operating in one of the plurality of forward ranges, the electro-hydraulic control system is operable to default to the first default mode of operation, wherein the electro-hydraulic control system is operable to disengage the second, fourth, and fifth torque transmitting devices and to engage the first and third torque transmitting devices.

11. A transmission operable in a plurality of modes of operation including at least one reverse range, a neutral mode of operation, and a plurality of forward ranges, the transmission comprising:

first, second, and third selectively engageable torque transmitting mechanisms;

an electro-hydraulic control system including:

a main source of fluid pressure;

first, second, and third trim valves operable to effect the engagement of respective first, second, and third torque transmitting mechanisms;

a latch valve in fluid communication with the first torque transmitting mechanism;

an interlock valve in selective fluid communication with the latch valve;

wherein said first trim valve is in fluid communication with said main source of fluid pressure;

wherein said latch valve and said interlock valve are in fluid communication with said main source of fluid pressure;

wherein said first trim valve is operable to selectively and variably communicate fluid pressure to said latch valve to effect engagement of the first torque transmitting mechanism;

wherein said interlock valve is operable to selectively communicate fluid pressure to one of said second and third trim valve to effect engagement of the respective second and third torque transmitting mechanism; and wherein the electro-hydraulic control system is operable to receive control signals from an electronic control unit and, based upon an interruption of said control signals, the electro-hydraulic control system is operable to default to one of a pair of drive-home modes of operation, including:

a first drive-home mode that is the same for each of the plurality of forward ranges; and a second drive-home mode that is the same for each of the at least one reverse range and the neutral mode of operation.

12. The transmission of claim 11, farther comprising:

a fifth torque transmitting mechanism;

wherein the electro-hydraulic control system further includes:

fifth trim valve in fluid communication with said main source of fluid pressure; and wherein said fifth trim valve is operable to effect the engagement of said fifth torque transmitting mechanism.

13. The transmission of claim 11, wherein said interlock valve is sufficiently configured to disallow fluid pressure to said second trim valve when fluid pressure is provided to said third trim valve and wherein said interlock valve is sufficiently configured to disallow fluid pressure to said third trim valve when fluid pressure is provided to said second trim valve.

14. The transmission of claim 11, wherein said electro-hydraulic control system further includes a solenoid valve operable to command said latch valve and said interlock valve to a pressure set position.

15. The transmission of claim 14, wherein said latch valve includes a differential area operable maintain said latch valve in said pressure set position when said first toque transmitting mechanism is engaged.

16. The transmission of claim 11, further comprising:
a fourth torque transmitting mechanism;
wherein said electro-hydraulic control system further includes:
   a fourth trim valve operable to effect the engagement of the fourth torque transmitting mechanism; and
   wherein said interlock valve selectively communicates fluid pressure to said fourth trim valve to effect engagement of the fourth torque transmitting mechanism.

17. The transmission of claim 16, wherein said interlock valve is sufficiently configured to disallow fluid pressure to said second trim valve when fluid pressure is provided to said fourth trim valve and wherein said interlock valve is sufficiently configured to disallow fluid pressure to said fourth trim valve when fluid pressure is provided to said second trim valve.

18. The transmission of claim 16, further comprising a first, second, third, and fourth accumulator valve in fluid communication with a respective one of said first, second, third, and fourth trim valves and operable to improve control of the engagement of respective first, second, third, and fourth torque transmitting mechanisms.

19. An electro-hydraulic control system for an automatically shiftable transmission having first, second, and third selectively engageable torque transmitting mechanisms, wherein the automatically shiftable transmission is operable in a plurality of modes of operation including at least one reverse range, a neutral mode of operation, and a plurality of forward ranges, the electro-hydraulic control system comprising:
a main source of fluid pressure;
first, second, and third trim valves operable to effect the engagement of respective first, second, and third torque transmitting mechanisms;
a latch valve in fluid communication with the first torque transmitting mechanism;
an interlock valve in selective fluid communication with the latch valve;
wherein said first trim valve is in fluid communication with said main source of fluid pressure;
wherein said latch valve and said interlock valve are in fluid communication with said main source of fluid pressure;
wherein said first trim valve is operable to selectively and variably communicate fluid pressure to said latch valve to effect engagement of the first torque transmitting mechanism;
wherein said latch valve includes a differential area operable maintain said latch valve in a pressure set position when the first toque transmitting mechanism is engaged;
wherein said interlock valve is operable to selectively communicate fluid pressure to one of said second and third trim valve to effect engagement of the respective second and third torque transmitting mechanism;
wherein said interlock valve is sufficiently configured to disallow fluid pressure to said second trim valve when fluid pressure is provided to said third trim valve and wherein said interlock valve is sufficiently configured to disallow fluid pressure to said third trim valve when fluid pressure is provided to said second trim valve; and
wherein the electro-hydraulic control system is operable to receive control signals from an electronic control unit and, based upon an interruption of said control signals, the electro-hydraulic control system is operable to default to one of a pair of drive-home modes of operation, including:
a first drive-home mode that is the same for each of the plurality of forward ranges; and
a second drive-home mode that is the same for each of the at least one reverse range and the neutral mode of operation.

20. The electro-hydraulic control system of claim 19, wherein the automatically shiftable transmission has a fourth torque transmitting mechanism and the electro-hydraulic control system further comprises:
a fourth trim valve operable to effect the engagement of the fourth torque transmitting mechanism;
wherein said interlock valve selectively communicates fluid pressure to said fourth trim valve to effect engagement of the fourth torque transmitting mechanism; and
wherein said interlock valve is sufficiently configured to disallow fluid pressure to said second trim valve when fluid pressure is provided to said fourth trim valve and wherein said interlock valve is sufficiently configured to disallow fluid pressure to said fourth trim valve when fluid pressure is provided to said second trim valve.

21. The electro-hydraulic control system of claim 20, further comprising a first, second, third, and fourth accumulator valve in fluid communication with a respective one of said first, second, third, and fourth trim valves and operable to improve control of the engagement of respective first, second, third, and fourth torque transmitting mechanisms.

22. An electro-hydraulic control system for an automatically shiftable transmission having a plurality of selectively engageable torque transmitting mechanisms, wherein the automatically shiftable transmission is operable in a plurality of modes of operation including at least one reverse range, a neutral mode of operation, and a plurality of forward ranges, the electro-hydraulic control system comprising:
a main source of fluid pressure;
first, second, and third trim valves operable to effect the engagement of respective first, second, and third torque transmitting mechanisms;
a latch valve in fluid communication with the first torque transmitting mechanism;
an interlock valve in selective fluid communication with the latch valve;
wherein said first trim valve is in fluid communication with said main source of fluid pressure;
wherein said latch valve and said interlock valve are in fluid communication with said main source of fluid pressure;
wherein said first trim valve is operable to selectively and variably communicate fluid pressure to said latch valve to effect engagement of the first torque transmitting mechanism;
wherein said interlock valve is operable to selectively communicated fluid pressure to one of said second and third trim valve to effect engagement of the respective second and third torque transmitting mechanism; wherein the electro-hydraulic control system is operable to lock out at least one torque transmitting mechanism based upon the mode of operation; and wherein the electro-hydraulic control system is operable to receive control signals from an electronic control unit and, based upon an interruption of said control signals, the electro-hydraulic control system is operable to default to one of a pair of default modes of operation, including:

a first default mode that is the same for each of the plurality of forward ranges; and a second default mode that is the same for each of the at least one reverse range and the neutral mode of operation.

23. The electro-hydraulic control system of claim 22, wherein when the mode of operation is one of a first forward range, a second forward range, and a third forward range, the electro-hydraulic control system prevents engagement of the second torque transmitting mechanism.

24. The electro-hydraulic control system of claim 22, wherein when the mode of operation is one of a third forward range and a fourth forward range, the electro-hydraulic control system prevents engagement of both the fourth and fifth torque transmitting mechanisms.

* * * * *